US012590646B2

(12) United States Patent
Larsen et al.

(10) Patent No.: US 12,590,646 B2
(45) Date of Patent: Mar. 31, 2026

(54) ACTIVE BALANCING VALVE FOR A REFRIGERATION AND/OR AIR-CONDITIONING APPLICATION

(71) Applicant: Danfoss A/S, Nordborg (DK)

(72) Inventors: Sigurd Larsen, Kruså (DK); Jens Boesen Pawlik, Broager (DK); Clemens Fock, Nordborg (DK)

(73) Assignee: DANFOSS A/S, Nordborg (DK)

( * ) Notice: Subject to any disclaimer, the term of this patent is extended or adjusted under 35 U.S.C. 154(b) by 206 days.

(21) Appl. No.: 18/548,159

(22) PCT Filed: Sep. 14, 2021

(86) PCT No.: PCT/EP2021/075221
§ 371 (c)(1),
(2) Date: Aug. 28, 2023

(87) PCT Pub. No.: WO2022/184288
PCT Pub. Date: Sep. 9, 2022

(65) Prior Publication Data
US 2024/0142021 A1    May 2, 2024

(30) Foreign Application Priority Data

Mar. 1, 2021    (DK) .............................. PA202100214

(51) Int. Cl.
*F16K 39/02*        (2006.01)
*F16K 1/36*         (2006.01)
(Continued)

(52) U.S. Cl.
CPC .............. *F16K 39/024* (2013.01); *F16K 1/36* (2013.01); *F25B 41/34* (2021.01); *F25B 41/325* (2021.01)

(58) Field of Classification Search
CPC .......... F16K 39/024; F16K 1/36; F25B 41/34; F25B 41/325
(Continued)

(56) References Cited

U.S. PATENT DOCUMENTS 3,405,906 A * 10/1968 Keller ................... F16K 31/408
                                                        251/38
5,205,531 A *  4/1993 Kolchinsky ........... F16K 31/408
                                                        251/38
(Continued)

FOREIGN PATENT DOCUMENTS

CN        208153800 U      11/2018
CN        110094514 A       8/2019
(Continued)

OTHER PUBLICATIONS

International Search Report mailed Dec. 20, 2021, in connection with corresponding International Application No. PCT/EP2021/075221; 4 pages.
(Continued)

*Primary Examiner* — John Bastianelli
(74) *Attorney, Agent, or Firm* — McCormick, Paulding & Huber PLLC

(57) ABSTRACT

An active balancing valve for a refrigeration and/or air-conditioning application having a valve housing with an inlet orifice, an outlet orifice and a mounting portion, a main valve element with a main pressure balance orifice and a control element at least partially defining a pressure balance passage. Each element is slidable inside the valve housing and comprises a control surface for controlling a fluid flow between the inlet orifice and the outlet orifice. The control element closes the main pressure balance orifice of the main valve element in a closed state of the valve.

20 Claims, 11 Drawing Sheets

(51) Int. Cl.
  *F25B 41/34*       (2021.01)
  *F25B 41/325*      (2021.01)
(58) Field of Classification Search
  USPC ........................................................ 251/123
  See application file for complete search history.

(56)                 References Cited

U.S. PATENT DOCUMENTS

| | | | | | |
|---|---|---|---|---|---|
| 5,735,582 | A | * | 4/1998 | Eith ...................... | B60T 8/4872 |
| | | | | | 251/30.01 |
| 5,842,679 | A | * | 12/1998 | Kolchinsky ........... | F16K 31/408 |
| | | | | | 251/38 |
| 6,443,420 | B1 | * | 9/2002 | Hettinger .............. | F16K 39/024 |
| | | | | | 251/38 |
| 6,708,772 | B2 | * | 3/2004 | Bermes .................. | A62C 35/68 |
| | | | | | 169/22 |
| 9,109,824 | B2 | | 8/2015 | Pawlik et al. | |
| 9,334,967 | B2 | | 5/2016 | Larsen et al. | |
| 10,151,517 | B2 | | 12/2018 | Thybo et al. | |
| 10,240,830 | B2 | | 3/2019 | Dam et al. | |
| 10,344,884 | B2 | | 7/2019 | Harck et al. | |
| 10,814,426 | B2 | | 10/2020 | Harck et al. | |
| 11,680,658 | B2 | | 6/2023 | Harck et al. | |
| 11,879,676 | B2 | | 1/2024 | Larsen et al. | |
| 2022/0065507 | A1 | | 3/2022 | Larsen | |
| 2023/0034594 | A1 | | 2/2023 | Rasmussen et al. | |

FOREIGN PATENT DOCUMENTS

| | | | |
|---|---|---|---|
| CN | 216045721 | U | 3/2022 |
| CN | 216382762 | U | 4/2022 |
| CN | 216715373 | U | 6/2022 |
| CN | 217519254 | U | 9/2022 |
| EP | 2359080 | A2 | 8/2011 |
| EP | 2653758 | A1 | 10/2013 |
| EP | 2986874 | A1 | 2/2016 |
| EP | 3620728 | A1 | 3/2020 |
| EP | 3671071 | A1 | 6/2020 |
| EP | 3671072 | A1 | 6/2020 |
| EP | 3671073 | A1 | 6/2020 |
| EP | 3672030 | A1 | 6/2020 |
| EP | 4227559 | A1 | 8/2023 |
| EP | 4302025 | A1 | 1/2024 |
| JP | 2004069152 | A | 3/2004 |
| JP | 2007-024186 | A | 2/2007 |
| JP | 2014196785 | A | 10/2014 |
| JP | 6545088 | B2 | 7/2019 |
| JP | 2019-132347 | A | 8/2019 |
| WO | 2010057496 | A2 | 5/2010 |
| WO | 2014169916 | A1 | 10/2014 |
| WO | 2022184288 | A1 | 9/2022 |
| WO | 2022223167 | A1 | 10/2022 |
| WO | 2023151858 | A1 | 8/2023 |
| WO | 2024008343 | A1 | 1/2024 |

OTHER PUBLICATIONS

International Search Report mailed on Apr. 12, 2023, in connection with corresponding International Application No. PCT/EP2022/074529 (15 pages).

* cited by examiner

ACTIVE BALANCING VALVE FOR A REFRIGERATION AND/OR AIR-CONDITIONING APPLICATION

CROSS-REFERENCE TO RELATED APPLICATIONS

This application is a National Stage application of International Patent Application No. PCT/EP2021/075221, filed on Sep. 14, 2021, which claims priority to Danish Patent Application No. PA202100214, filed on Mar. 1, 2021, each of which is hereby incorporated by reference in its entirety.

TECHNICAL FIELD

The present invention pertains to an active balancing valve for a refrigeration and/or air-conditioning application. The valve comprises a valve housing with an inlet orifice, an outlet orifice and a mounting portion, a main valve element with a main pressure balance orifice and a control element at least partially defining a pressure balance passage. Each element is slidable inside the valve housing and comprises a control surface for controlling a fluid flow between the inlet orifice and the outlet orifice. The control element closes the main pressure balance orifice of the main valve element in a closed state of the valve.

BACKGROUND

Balanced valves known from prior art are typically used as medium to large capacity expansion valves. Here, a control element in the form of a cone or piston is provided for controlling the aperture of the valve. Due to the pressure difference between an inlet and outlet of the valve, a considerable resulting force may be acting on the control element, exacerbating the movement of the control element and therefore the functioning of the valve. In order to reduce the forces acting on the control element, the pressure acting on the control element is balanced. The pressure balancing therefore reduces or eliminates the force needed to operate the control element at high differential pressures.

However, a problem of the known balanced valves is that balancing the control element in the described manner introduces a secondary leak path. To avoid excessive leakage in the valve's closed position, a secondary seal is typically introduced. This is often a dynamic seal, situated between the control element and the valve housing, causing friction as the control element moves up and down. The friction from this seal can in some cases be the main force requirement for an actuator for moving the control element. Hence, the seal increases the overall force requirement and thereby increases the size and cost of the overall solution. In addition, the friction can introduce open and control hysteresis, limiting the control accuracy of the valve.

SUMMARY

The task of the present invention is to provide an improved balancing valve, which overcomes the problems outlined above. This task is solved by an active balancing valve comprising the features of the independent claim(s). Advantageous embodiments of the invention are subject of the dependent claims.

According to the invention, an active balancing valve for a refrigeration and/or air-conditioning application is provided. The active balancing valve comprises a valve housing with an inlet orifice, an outlet orifice and a mounting portion, a main valve element with a main pressure balance orifice and a control element at least partially defining a pressure balance passage. Each element is slidable inside the valve housing and comprises a control surface for controlling a fluid flow between the inlet orifice and the outlet orifice. The term "control surface" in the context of the present invention refers to a portion of a component, which is or which may be in direct contact with a fluid for controlling the amount of a corresponding fluid flow. The fluid flow may be controlled by spacing the control surface with respect to another surface or by contacting the control surface and said other surface. The space or lack thereof between the control surface and the other surface controls the fluid flow.

The main valve element comprises a main control surface, which may be spaced apart from, or contact a valve seat for controlling the fluid flow between the inlet orifice and the outlet orifice. The control element comprises a secondary control surface, which may be spaced apart from, or contact the main pressure balance orifice for controlling the pressure propagation between the inlet orifice, the outlet orifice and a fluid chamber. The contacting of the main pressure balance orifice may be understood as the contacting of an edge of the main pressure balance orifice and therefore the closing of the main pressure balance orifice by the secondary control surface. The control element closes the main pressure balance orifice of the main valve element in a closed state of the valve.

The valve according to the present invention makes it possible to use a secondary seal, which only provides sealing in the closed valve position. Furthermore, the balancing of the valve only occurs when the valve is supposed to open. As a result, an actively balanced valve is provided, that removes the friction contribution from the secondary seal resulting in a significant reduction of actuator force requirement. At the same time, control hysteresis is eliminated.

In a preferred embodiment of the invention, the control element is provided at least partially inside the main valve element. The two elements may be of cylindrical form, such that the control element can be slid at least partially into the main valve element through a cylindrical face of the main valve element. The described cylindrical form may be understood in a broad sense and may refer to a partially cylindrical or cylinder-like shape.

In another preferred embodiment of the invention, the control element is slidable relative to the main valve element, wherein preferably the sliding distance corresponds to the distance between the position at which a secondary control surface of the control element contacts the main pressure balance orifice and the position at which a secondary stopper of the control element contacts a main stopper of the main valve element.

In another preferred embodiment of the invention, the secondary stopper and the main stopper are contactable for blocking a fluid passage from the inlet orifice to the outlet orifice. By providing this perfect or near perfect fluid barrier a perfect or near perfect pressure balancing at up to 100% can be achieved. Also, the stoppers may combine two functions at one and the same portion of the valve: the blocking of a fluid passage from the inlet orifice to the outlet orifice and the limiting of a relative movement of the two concerned components. This combination of two functions simplifies the manufacturing of the valve such that the tolerance requirements can be simplified.

In another preferred embodiment of the invention, a secondary pressure balance orifice is provided in the control element between the secondary control surface and the secondary stopper of the control element. Allocating the secondary pressure balance orifice between the secondary control surface and the secondary stopper ensures that a pressure balancing path can be provided across the control element even in a state in which the stoppers of the control element and the main valve element are engaged to block a fluid passage from the inlet to the outlet orifice.

In another preferred embodiment of the invention, the main valve element comprises two main valve element portions, wherein an internal main valve element portion is insertable into an outer main valve element portion and comprises the main stopper. The two distinguished portions of the main valve element facilitate its manufacturing and the provision of varying internal diameters of the main valve element, said varying internal diameters being used as a stopper, as a control surface and/or as a guiding surface.

In another preferred embodiment of the invention, the two main valve element portions comprise fluid conduits for fluidly connecting the inlet orifice to the inside of the internal main valve element portion. The fluid conduits of the main valve element portions may be provided at a position, which corresponds to an intermediate diameter, portion of the control element, such that fluid flow between the inlet orifice and the outlet orifice is facilitated.

In another preferred embodiment of the invention, a linear actuator or a portion of a linear actuator for actuating the control element is provided at the mounting portion.

In another preferred embodiment of the invention, a fluid chamber is provided between the linear actuator on the one side and the control element and the main valve element on the other side, said fluid chamber being fluidly connected to the pressure balance passage. The positioning and the geometry of the fluid chamber ensures that the pressure of the fluid inside the chamber may act on one side of the main valve element and/or the control element for balancing the pressure acting on the other side of the main valve element. In particular, the area upon which the pressure inside the fluid chamber acts in an axial direction towards the main valve element and/or the control element may be equal to the area exposed to the pressure acting on the main valve element and/or the control element at the outlet orifice of the valve.

In another preferred embodiment of the invention, a spring is provided for pressing the control element and/or the main valve element in the direction of the outlet orifice. The spring may ensure that the valve is kept close in a default state, in which no force may be applied to the main valve element by an actuator.

In another preferred embodiment of the invention, the control element comprises a check valve and/or the main valve element comprises a seal towards the valve housing. The check valve may ensure that the fluid chamber is only connected to the inlet orifice and/or outlet orifice if the pressure across the check valve exceeds some threshold value. Alternatively or additionally, the check valve may ensure that pressure balancing can be performed at reverse flow conditions, in which the fluid pressure is higher at the outlet orifice than at the inlet orifice. I these conditions, the check valve may ensure that the valve is pressure balanced by opening a fluid path between the high pressure outlet orifice and the fluid chamber, such that the high pressure acting on the control element and/or the main valve element at the outlet orifice is balanced by the same high pressure acting on the control element and/or the main valve element at the fluid chamber.

In another preferred embodiment of the invention, the control element is slidable relative to the main valve element and/or the control element comprises a large diameter cylindrical portion and small diameter cylindrical portion, wherein the large diameter cylindrical portion extends over a greater distance in an axial direction of the valve than the small diameter cylindrical portion.

In another preferred embodiment of the invention, a secondary pressure balance orifice is provided at the small diameter cylindrical or conical portion or between the large diameter cylindrical portion and the small diameter cylindrical or conical portion and/or the pressure balance passage is connected to the secondary pressure balance orifice. A conical portion may be provided between the large diameter cylindrical portion and the small diameter cylindrical or conical portion. The secondary pressure balance orifice may be aligned perpendicular to the pressure balance passage.

In another preferred embodiment of the invention, the control element is slidable relative to the main valve element and/or the control element comprises a large diameter cylindrical portion, a small diameter cylindrical portion, an intermediate diameter cylindrical portion and a short large diameter cylindrical portion, wherein the large diameter cylindrical portion extends over a greater distance in an axial direction of the valve than the small diameter cylindrical or conical portion and/or wherein the intermediate diameter cylindrical portion is positioned between the large diameter cylindrical portion and the short large diameter cylindrical portion.

In another preferred embodiment of the invention, another secondary pressure balance orifice is provided at the short large diameter cylindrical portion and preferably, the pressure balance passage is connected to the other secondary pressure balance orifice.

In another preferred embodiment of the invention, the large diameter cylindrical portion and the short large diameter cylindrical portion have the same diameter.

In another preferred embodiment of the invention, the interior of the main valve element comprises an internal small diameter cylindrical portion and an internal large diameter cylindrical portion, wherein the internal small diameter cylindrical portion is longer than the internal large diameter cylindrical portion in an axial direction thereof In another preferred embodiment of the invention, a secondary stopper of the control element is provided opposite the small diameter cylindrical or conical portion for contacting a main stopper of the main valve element and/or a fluid conduit is provided for fluidly connecting the inlet orifice to the inside of the main valve element.

In another preferred embodiment of the invention, the distance between the internal small diameter cylindrical portion and the short large diameter cylindrical portion at least partially defines a fluid passage from the inlet orifice to the outlet orifice.

BRIEF DESCRIPTION OF THE DRAWINGS

Further details and advantages of the invention are disclosed in the claim set and the following description of the embodiments shown in the figures. The figures show:

DETAILED DESCRIPTION

Figure 1:
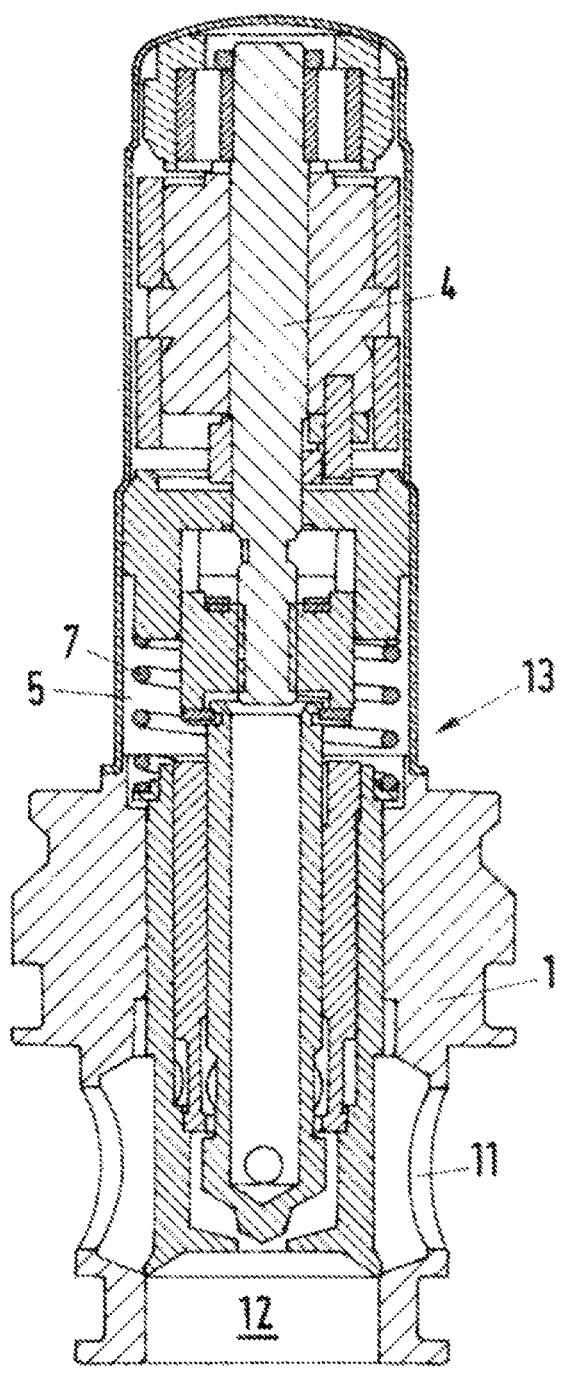
FIG. 1: a sectional view of a first embodiment of the invention.

FIG. 1 shows a sectional view of a first embodiment of the active balancing valve according to the invention. The valve comprises a valve housing 1 with an inlet orifice 11, an outlet orifice 12 and a mounting portion 13. The inlet and outlet orifices 11, 12 may provide a fluid connection between the inside and the outside of the valve, such that a fluid may flow between the orifices 11, 12 in an open state of the valve. The valve may be provided for allowing a fluid flow in any direction between the two orifices 11, 12. The term orifice may be understood in a broad sense and may comprise a plurality of orifices. For example, inlet orifice 11 comprises two or more separated orifices, which may be arranged in a circumferential direction around a centre axis of the valve. The inlet orifices 11 may be oriented perpendicular to the outlet orifice 12. The mounting portion 13 may comprise a circular opening for inserting components of the valve and/or some mounting geometry for mounting an actuator such as a linear actuator 4. The valve may comprise a complete linear actuator 4 or a part of a linear actuator 4 for actuating the control element 2.

Between the linear actuator 4 and the housing 1, a fluid chamber 5 and/or a spring 7 may be provided. The spring 7 and/or the fluid inside the fluid chamber 5 may exert a force on other components of the valve.

Figure 2:
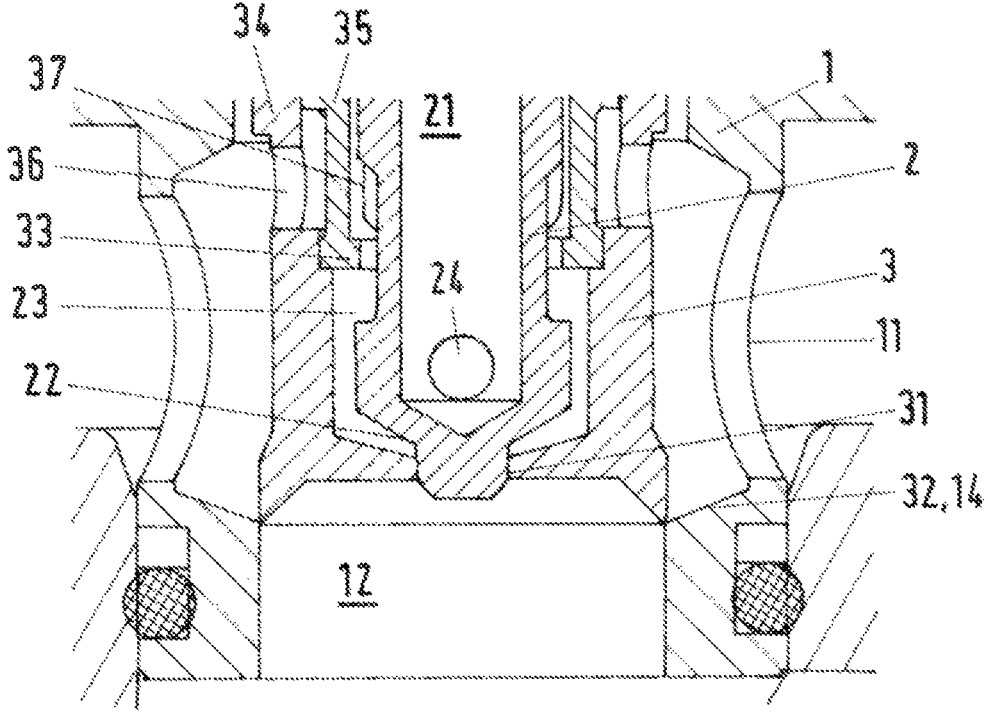
FIG. 2: an enlarged sectional view of the first embodiment of the invention.

FIG. 2 is an enlarged sectional view of the first embodiment of the invention shown in FIG. 1. Throughout the description and the figures, like reference number are used for like features for clarity's sake. Here, components that may be inserted into the valve housing 1, are shown enlarged and include a main valve element 3 with a main pressure balance orifice 31 and a control element 2 The control element 2 is provided at least partially inside the main valve element 3. An upper portion of the control element 2 may 10ylindn outside the main valve element 3 for facilitating the connection of the control element to the linear actuator 4.

The main pressure balance orifice 31 of the main valve element 3 is shown closed by control element 2 in a closed state of the valve. Inserting the secondary control surface 22 of the control element 2 into the main pressure balance orifice 31 limits the fluid connection between the outlet orifice 12 and the fluid chamber 5 and therefore at least partially defines a pressure balance passage 21 between the outlet orifice 12 and the fluid chamber 5. In other words, the position of the control element 2 inside the main valve element 3 varies the degree to which pressure can propagate between the fluid chamber 5 and the orifices 11, 12, as a result providing pressure balancing of the control element 2 and/or the main valve element 3.

The pressure balance passage 21 may be understood as a part or the complete fluid passage between the fluid chamber 5 shown in FIG. 1 and the main pressure balance orifice 31.

The control element 2 and the main valve element 3 may be slidably arranged inside the valve housing 1. Each of these elements 2, 3 may comprise at least one control surface 22, 32 for controlling a fluid flow between the inlet orifice 11 and the outlet orifice 12.

The control element 2 is slidable relative to the main valve element 3. The sliding distance may correspond to the distance between the position at which a secondary control surface 22 of the control element 2 contacts the main pressure balance orifice 31 and the position at which a secondary stopper 23 of the control element 2 contacts a main stopper 33 of the main valve element 3. The secondary stopper 23 of the control element 2 may comprise an at least partially circular edge, which may abut a corresponding portion of the main stopper 33 of the main valve element 3.

The secondary stopper 23 and the main stopper 33 are contactable for blocking a fluid passage from the inlet orifice 11 to the outlet orifice 12. In this case, both stoppers 23, 33 may comprise contact planes, which are provided in a circumferential direction of the control element 2 and the main valve element 3, respectively. As the contact planes are approached and finally brought in contact with each other, a gap between these planes is minimized such that finally upon contact no or only negligible fluid flow is possible across the stoppers 23, 33.

Pressure may then propagate from the outlet orifice 12 to the fluid chamber 5 via a secondary pressure balance orifice 24, which is provided in the control element 2 and between the secondary control surface 22 and the secondary stopper 23 of the control element 2. In the situation shown in FIG. 2, the outlet orifice 12 is closed fluidly by control surface 22 closing main pressure balance orifice 31 and main control surface 32 closing the valve seat 14.

The main valve element 3 may comprise two main valve element portions 34, 35. Here, an internal main valve element portion 35 is insertable into an outer main valve element portion 34. The internal main valve element portion 35 comprises the main stopper 33. The two main valve element portions comprise fluid conduits 36, 37 for fluidly connecting the inlet orifice 11 to the inside of the internal main valve element portion 35. The internal main valve element portion 35 may comprise at least one internal fluid conduit 37 and the outer main valve element portion 34 may comprise at least one outer fluid conduit 36. Between the fluid conduits 36, 37, a circumferential gap may be provided for facilitating fluid connection between said fluid conduits 36, 37.

Figures 3A, 3B, 3C, 3D:
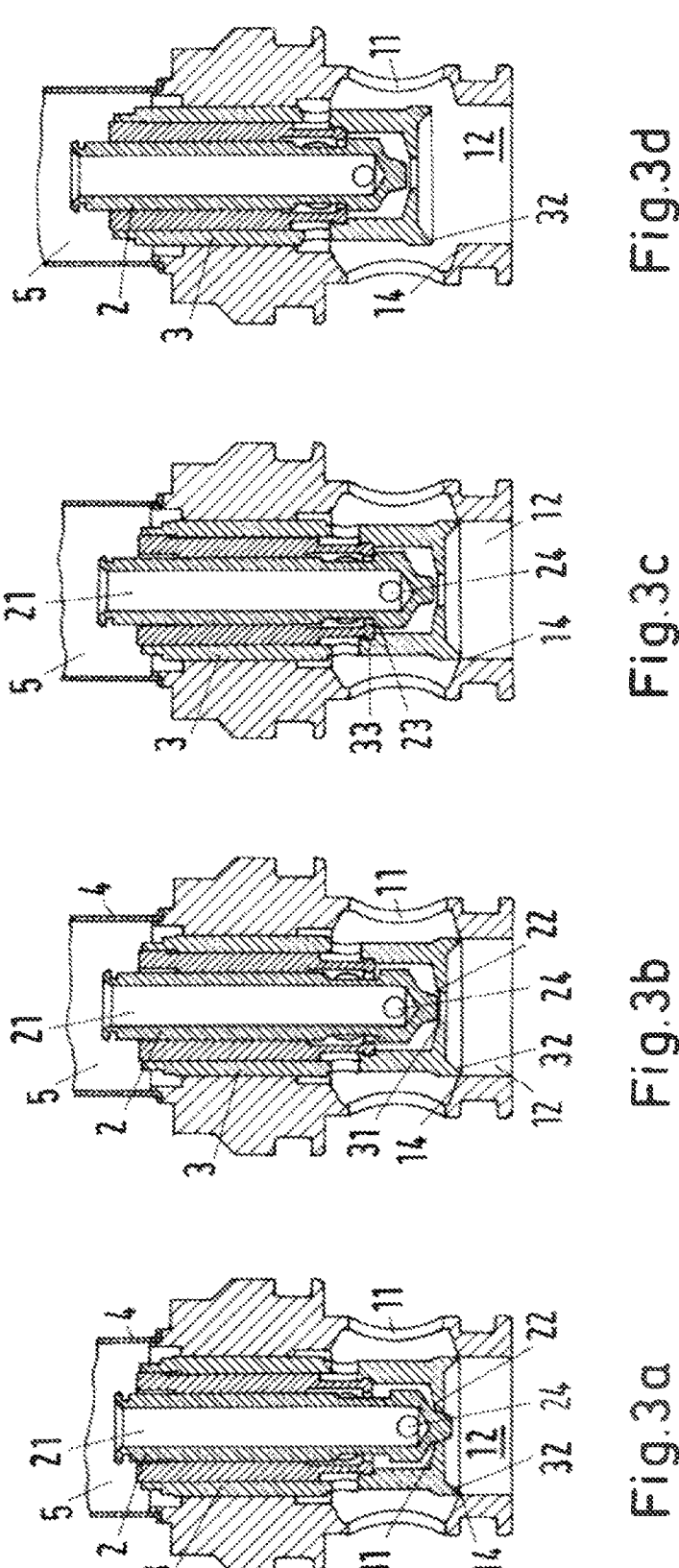
FIG. 3a: a sectional view of the first embodiment of the invention at various valve positions.
FIG. 3b: a sectional view of the first embodiment of the invention at various valve positions.
FIG. 3c: a sectional view of the first embodiment of the invention at various valve positions.
FIG. 3d: a sectional view of the first embodiment of the invention at various valve positions.

FIGS. 3a-3d show sectional views of the first embodiment of the invention at various valve positions. FIG. 3a shows the valve in a fully closed position. Here, the linear actuator 4 has pushed the control element 2 to its lowest position, effectively pushing main valve element 3 against valve seat 14, such that the main control surface 32 closes a fluid path between inlet and outlet orifices 11, 12. Simultaneously, secondary control surface 22 contacts the main pressure balance orifice 31 for closing another fluid path between the outlet orifice 12 and both, the inlet orifice 11 and the fluid chamber 5. The secondary pressure balance orifice 24 and the pressure balance passage 21 fluidly connect the fluid chamber 5 to the inlet orifice 11.

FIG. 3b shows the valve in a partially pressure balanced position. Here, the actuator 4 has moved the control element 2 upwards, such that the secondary control surface 22 no longer contacts the main pressure balance orifice 31. Both, the inlet orifice 11 and the outlet orifice 12 communicate with the fluid chamber 5 via the secondary pressure balance orifice 24 and the pressure balance passage 21. The pressure inside fluid chamber 5 is determined by the difference in pressure differences occurring between the inlet orifice 11 and the secondary balance orifice 24 on the one side and the outlet orifice 12 and the secondary balance orifice 24 on the other side. As, depending on the position of the control element 2 within the main valve element 3, the pressure difference between the inlet orifice 11 and the secondary balance orifice 24 may be greater than the pressure difference between the outlet orifice 12 and the secondary balance orifice 24, the pressure inside the fluid chamber 5 may be closer to the pressure at the outlet orifice 12 than the pressure at the inlet orifice 11.

FIG. 3c shows the valve in a fully pressure balanced position. The actuator 4 has moved the control element 2 further upwards, such that the secondary stopper 23 contacts the main stopper 33. As the stoppers 23, 33 may contact each other such that no or only negligible fluid flow may occur across the stoppers 23, 33 such that only the outlet orifice 12 communicates with the fluid chamber 5 via the secondary pressure balance orifice 24 and the pressure balance passage 21. The pressure inside fluid chamber 5 is determined by the pressure difference occurring between the outlet orifice 12 and the secondary balance orifice 24. The pressure inside fluid chamber 5 may approach or be equal to the pressure at outlet orifice 12. The valve is now fully pressure balanced such that the force required to lift the main valve element 3 from the valve seat 14 is minimized. In order to obtain a fully balanced state, the areas of the main valve element 3 and/or the control element 2 upon which the pressures on the side of the fluid chamber 5 and on the side of the outlet orifice 12 act may be chosen to be equal.

FIG. 3d shows the valve in a fully open position. The control element 2 has lifted the main valve element 3 such that the main control surface 32 no longer contacts the valve seat 14. In this position, a fluid flow between the inlet orifice 11 and the outlet orifice 12 encounters the least resistance.

Figure 4:
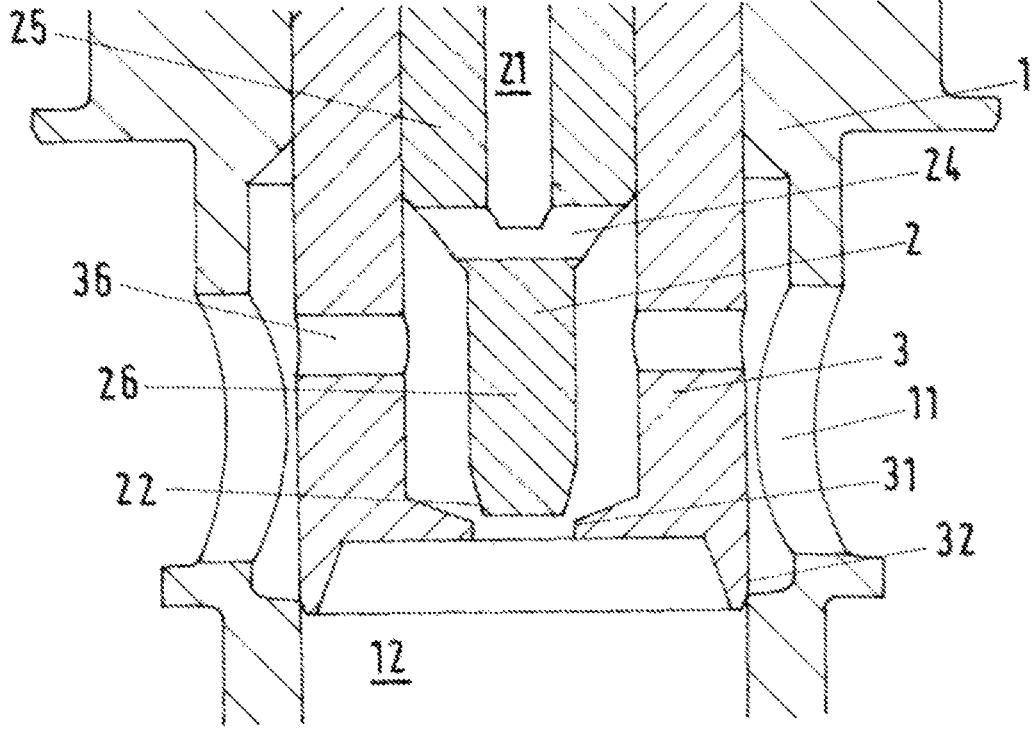
FIG. 4: an enlarged sectional view of a second embodiment of the invention.

FIG. 4 shows an enlarged sectional view of a second embodiment of the invention. Here, as in the previous example, the control element 2 is slidable relative to the main valve element 3. The control element 2 comprises a large diameter cylindrical portion 25 and small diameter cylindrical or conical portion 26. These two sections 25, 26 may extend over the near total length of the control element 2. As an example, these two cylindrical portions may extend over 80% or 90% or more of the length of the control element 2. The term "cylindrical" may be understood in a broad sense throughout the description and unless otherwise specified, such that the cylindrical portions 25, 26 may contain fluid passages and/or groves or other features, which might represent some deviations from a perfect cylinder, form. Although not clearly visible in the enlarged view of FIG. 4, the large diameter cylindrical portion 25 extends over a greater distance in an axial direction of the valve than the small diameter cylindrical or conical portion 26. The axial direction of the valve may correspond to the vertical direction of FIG. 4.

As in the previous embodiment, a secondary pressure balance orifice 24 is provided. The pressure balance orifice 24 is located between the large diameter cylindrical portion 25 and the small diameter cylindrical or conical portion 26. Alternatively or additionally, the secondary pressure balance orifice 24 may be located at the small diameter cylindrical or conical portion 26. In any case, the pressure balance passage 21 is connected to the secondary pressure balance orifice 24 to form a fluid connection between the fluid chamber 5 at the top of the control element 2 shown in the following FIGS. 5a-5c and the bottom of the control element 2, corresponding to the secondary control surface 22 of the control element 2. A fluid conduit 36 is provided for fluidly connecting the inlet orifice 11 to the inside of the main valve element 3.

Figure 5C:
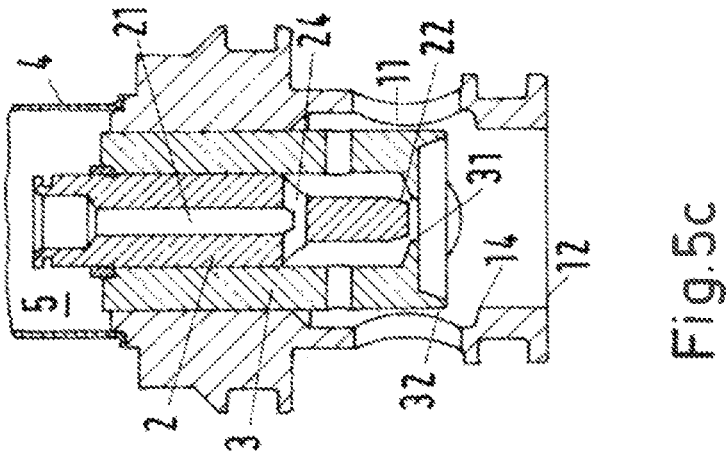
FIG. 5c: a sectional view of the second embodiment of the invention at various valve positions.
Figure 5B:
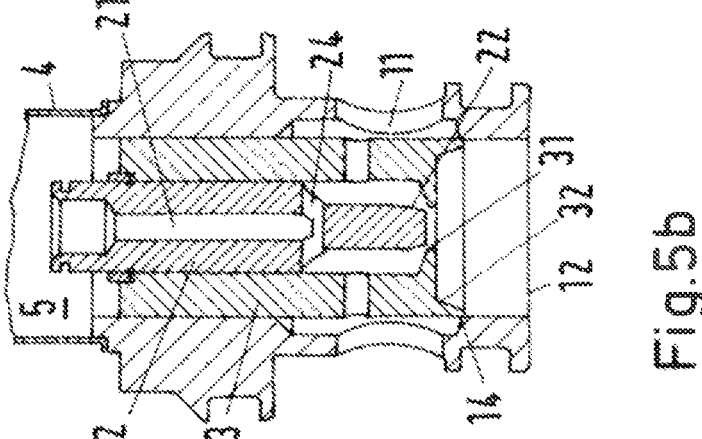
FIG. 5b: a sectional view of the second embodiment of the invention at various valve positions.
Figure 5A:
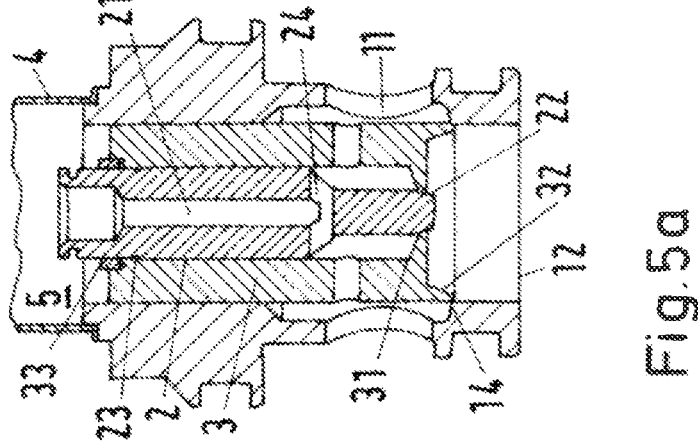
FIG. 5a: a sectional view of the second embodiment of the invention at various valve positions.

FIGS. 5a-5c show sectional views of the second embodiment of the invention at various valve positions. FIG. 5a shows the valve in a fully closed position. Here, the linear actuator 4 has pushed the control element 2 to its lowest position, effectively pushing main valve element 3 against valve seat 14, such that the main control surface 32 closes a fluid path between inlet and outlet orifices 11, 12. Simultaneously, secondary control surface 22 contacts the main pressure balance orifice 31 for closing another fluid path between the outlet orifice 12 and both, the inlet orifice 11 and the fluid chamber 5. The secondary pressure balance orifice 24 and the pressure balance passage 21 fluidly connect the fluid chamber 5 to the inlet orifice 11.

FIG. 5b shows the valve in a pressure balanced position. Here, the actuator 4 has moved the control element 2 upwards when compared to the situation shown in FIG. 5a. The secondary control surface 22 no longer contacts the main pressure balance orifice 31. Both, the inlet orifice 11 and the outlet orifice 12 communicate with the fluid chamber 5 via the secondary pressure balance orifice 24 and the pressure balance passage 21. The pressure inside fluid chamber 5 is determined by the difference in pressure differences occurring between the inlet orifice 11 and the secondary balance orifice 24 on the one side and the outlet orifice 12 and the secondary balance orifice 24 on the other side. As the pressure difference between the inlet orifice 11 and the secondary balance orifice 24 may be greater than the pressure difference between the outlet orifice 12 and the secondary balance orifice 24, the pressure inside the fluid chamber 5 may be closer to the pressure at the outlet orifice 12 than the pressure at the inlet orifice 11. As the areas upon which the pressures at the side of the fluid chamber 5 and the outlet orifice 12 act upon the control element 2 and/or the main valve element 3 may be chosen to be equal, the resulting forces on the control element 2 and/or the main valve element 3 balance out, such that at least partial pressure balancing may occur.

FIG. 5c shows the valve in a fully open position. The actuator 4 has moved the control element 2 further upwards, such that the main control surface 32 no longer contacts the valve seat 14. In this position, a fluid flow between the inlet orifice 11 and the outlet orifice 12 encounters the least resistance.

As a major difference between the first and second embodiment, in the second embodiment the stoppers 23, 33 are positioned close to the end portions of the main valve element 3 and the control element 2 opposite the secondary control surface 22. Whereas the stoppers 23, 33 are shown spaced apart in FIG. 5a, the secondary stopper 23 contacts the main stopper 33 in FIGS. 5b and 5c. By contacting the stoppers 23, 33 of the control element 2 and the main valve element 3, a force can be exerted by the control element 2 on the main valve element 3 for moving both said elements 2, 3 towards the actuator 4.

Figure 6:
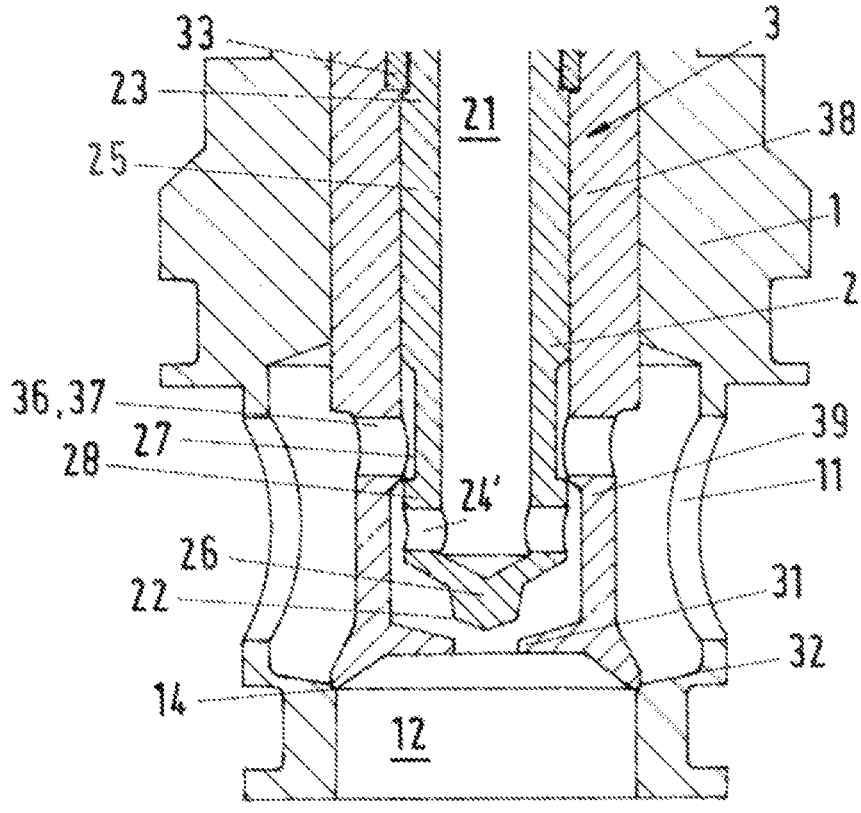
FIG. 6: an enlarged sectional view of a third embodiment of the invention.

FIG. 6 shows an enlarged sectional view of a third embodiment of the invention. Again, as in the previous embodiments, the control element 2 is slidable relative to the main valve element 3. In the third embodiment, the control element 2 comprises a large diameter cylindrical portion 25, a small diameter cylindrical or conical portion 26, an intermediate diameter cylindrical portion 27 and a short large diameter cylindrical portion 28. The large diameter cylindrical portion 25 extends over a greater distance in an axial direction of the valve than the small diameter cylindrical or conical portion 26 and may represent the longest portion of the control element 2. The intermediate diameter cylindrical portion 27 is positioned between the large diameter cylindrical portion 25 and the short large diameter cylindrical portion 28. The large diameter cylindrical portion 25 and the short large diameter cylindrical portion 28 may be of equal diameter. The mentioned diameters refer to the outer diameters of the given portions, as the inner diameters of said portions may be identical.

Another secondary pressure balance orifice 24' is provided at the short large diameter cylindrical portion 28 and the pressure balance passage 21 is connected to the other secondary pressure balance orifice 24'. Alternatively or additionally, another secondary pressure balance orifice 24' may be located at the small diameter cylindrical or conical portion 26.

The interior of the main valve element 3 comprises an internal small diameter cylindrical portion 38 and an internal large diameter cylindrical portion 39. The internal small diameter cylindrical portion 38 may be longer than the internal large diameter cylindrical portion 39 in an axial direction thereof. The axial distance between the internal small diameter cylindrical portion 38 of the main valve element 3 and the short large diameter cylindrical portion 28 of the control element 2 define a fluid flow path between the inlet orifice 11 and the other secondary pressure balance orifice 24' and/or the outlet orifice 12. The closer an edge of the internal small diameter 17ylinderical portion 38 approaches an edge of the short large diameter cylindrical portion 28, the greater the flow resistance for a fluid flow between the inlet orifice 11 and the other secondary pressure balance orifice 24' and/or the outlet orifice.

In the second and third embodiments, a secondary stopper 23 of the control element 2 is provided opposite the small diameter cylindrical or conical portion 26 for contacting a main stopper 33 of the main valve element 3.

Figure 7D:
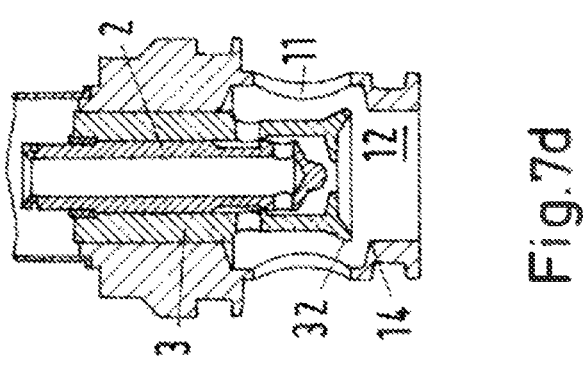
FIG. 7d: a sectional view of the third embodiment of the invention at various valve positions.
Figure 7C:
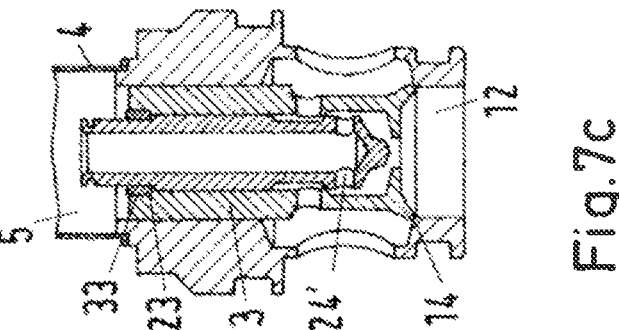
FIG. 7c: a sectional view of the third embodiment of the invention at various valve positions.
Figure 7B:
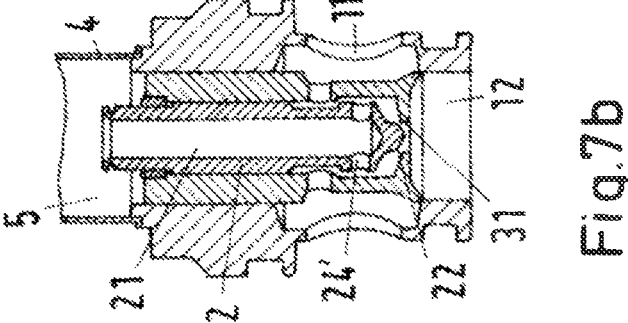
FIG. 7b: a sectional view of the third embodiment of the invention at various valve positions.
Figure 7A:
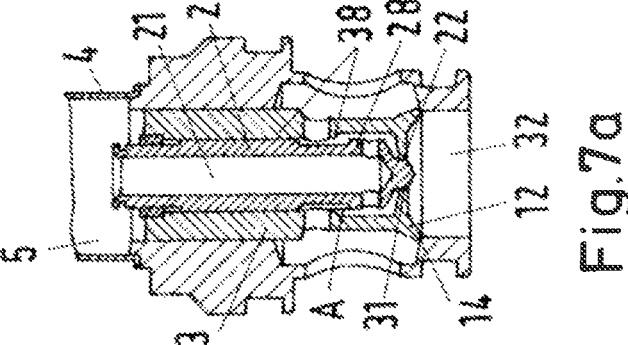
FIG. 7a: a sectional view of the third embodiment of the invention at various valve positions.

FIGS. 7a-7d show sectional views of the third embodiment of the invention at various valve positions. FIG. 7a shows the valve in a fully closed position. Here, the linear actuator 4 has pushed the control element 2 to its lowest position, pushing main valve element 3 against valve seat 14, such that the main control surface 32 closes a fluid path between inlet and outlet orifices 11, 12. Simultaneously, secondary control surface 22 contacts the main pressure balance orifice 31 for closing another fluid path between the outlet orifice 12 and both, the inlet orifice 11 and the fluid chamber 5. The other secondary pressure balance orifice 24' and the pressure balance passage 21 fluidly connect the fluid chamber 5 to the inlet orifice 11.

In the case of the third embodiment, the distance A between the internal small diameter cylindrical portion 38 and the short large diameter cylindrical portion 28 at least partially defines a fluid passage from the inlet orifice 11 to the outlet orifice 12. In the situation shown in FIG. 7a, the distance A is at its maximum while at the same time the secondary control surface 22 contacts the main pressure balance orifice 31. The outlet 12 does not communicate with the fluid chamber 5.

FIG. 7b shows the valve in a partially pressure balanced position. Here, the actuator 4 has moved the control element 2 upwards, such that the secondary control surface 22 no longer contacts the main pressure balance orifice 31. Both, the inlet orifice 11 and the outlet orifice 12 communicate with the fluid chamber 5 via the secondary pressure balance orifice 24' and the pressure balance passage 21. The pressure inside fluid chamber 5 is determined by the difference in pressure differences occurring between the inlet orifice 11 and the secondary balance orifice 24 on the one side and the outlet orifice 12 and the secondary balance orifice 24 on the other side. As the pressure difference between the inlet orifice 11 and the secondary balance orifice 24 may be greater than the pressure difference between the outlet orifice 12 and the secondary balance orifice 24, the pressure inside the fluid chamber 5 may be closer to the pressure at the outlet orifice 12 than the pressure at the inlet orifice 11.

FIG. 7c shows the valve in a fully pressure balanced position. The actuator 4 has moved the control element 2 further upwards, such that the secondary stopper 23 contacts the main stopper 33. The pressure inside fluid chamber 5 is determined by the pressure difference occurring between the outlet orifice 12 and the secondary balance orifice 24. The pressure inside fluid chamber 5 may approach or be equal to the pressure at outlet orifice 12. The valve is now at least partially pressure balanced, as the flow from the inlet orifice 11 towards the other secondary orifice 24' is minimised such that the force required to lift the main valve element 3 from the valve seat 14 is minimized.

FIG. 7d shows the valve in a fully open position. The control element 2 has lifted the main valve element 3 such that the main control surface 32 no longer contacts the valve seat 14. In this position, a fluid flow between the inlet orifice 11 and the outlet orifice 12 encounters the least resistance.

Figure 8:
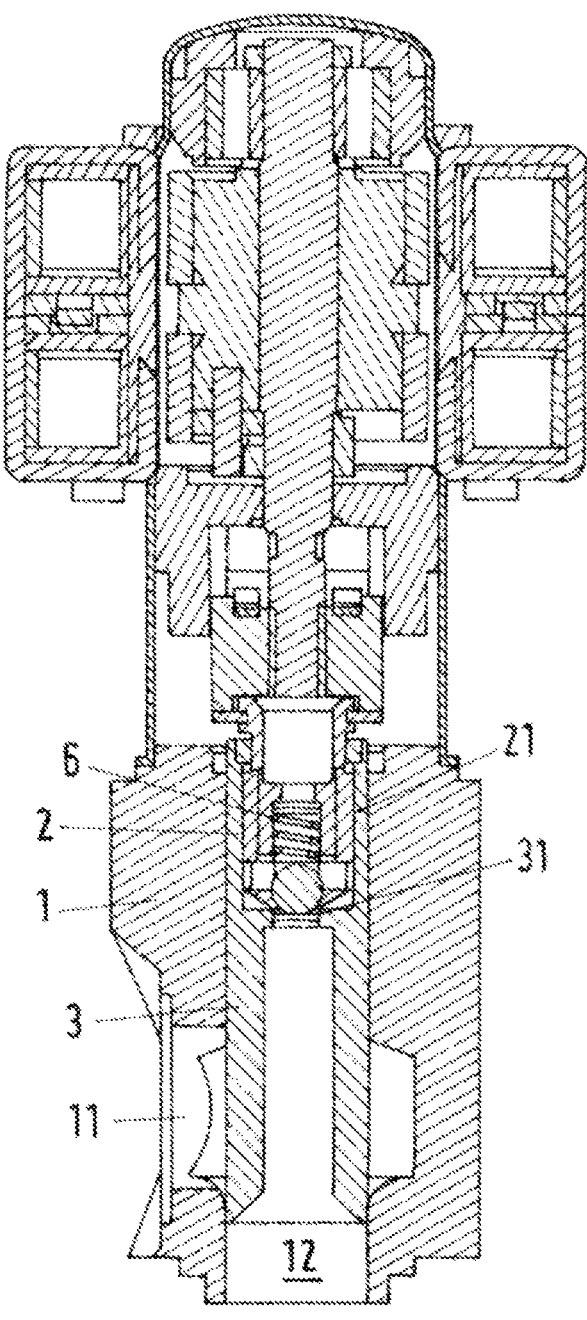
FIG. 8: a sectional view of a fourth embodiment of the invention.

FIG. 8 shows a sectional view of a fourth embodiment of the invention. A major difference between the fourth embodiment and the previous embodiments is that the fluid passage 21 is not located inside the control element 2 but rather between an outside face of control element 2 and an inside face of the main valve element 3. The main valve element 3 comprises a main pressure balance orifice 31 but no previously shown fluid conduits 36, 37 for fluidly connecting the inlet orifice 11 to the inside of the main valve element 3. The control element 2 comprises a check valve 6.

Figure 9C:
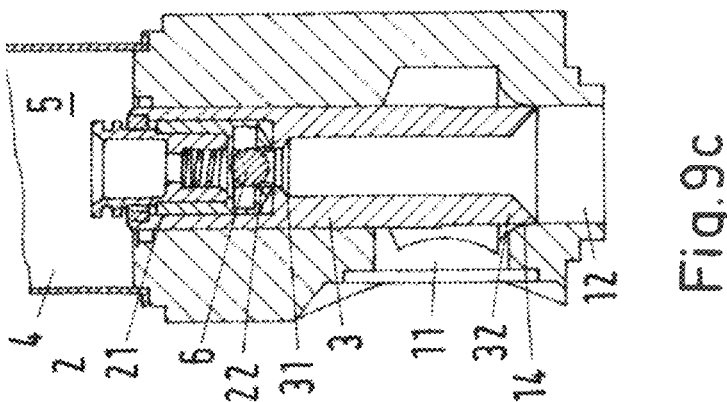
FIG. 9c: a sectional view of the fourth embodiment of the invention at various valve positions.
Figure 9B:
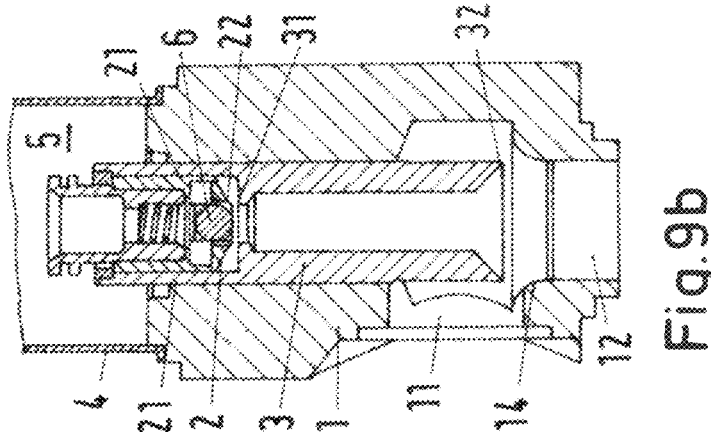
FIG. 9b: a sectional view of the fourth embodiment of the invention at various valve positions.
Figure 9A:
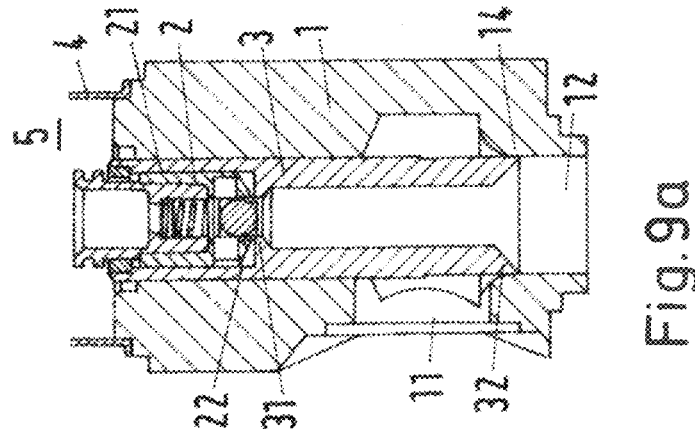
FIG. 9a: a sectional view of the fourth embodiment of the invention at various valve positions.

FIGS. 9a-9c show sectional views of the fourth embodiment of the invention at various valve positions. FIG. 9a shows the valve in a fully closed position. Here, the linear actuator 4 has pushed the control element 2 to its lowest position, effectively pushing main valve element 3 against valve seat 14, such that the main control surface 32 closes a fluid path between inlet and outlet orifices 11, 12. Simultaneously, secondary control surface 22 contacts the main pressure balance orifice 31 for closing another fluid path between the outlet orifice 12 and the fluid chamber 5.

FIG. 9b shows the valve in a fully open position. The actuator 4 has moved the control element 2 upwards, such that the main control surface 32 no longer contacts the valve seat 14. In this position, a fluid flow between the inlet orifice 11 and the outlet orifice 12 encounters the least resistance. The pressure balance passage 21 fluidly connects the fluid chamber 5 to the outlet orifice 12, as the main pressure balance orifice 31 is not in contact with the secondary control surface 22.

FIG. 9c shows the valve in reverse flow conditions. High pressure is now present at the outlet orifice 12 and low pressure at the inlet orifice 11. The high pressure acts on the check valve 6 such that pressure balancing may occur through the check valve 6. The secondary control surface 22 may no longer contact the main pressure balance orifice 31. The outlet orifice 12 communicates with the fluid chamber 5 via the pressure balance passage 21. The pressure inside fluid chamber 5 may be close or equal to the pressure at the outlet orifice 12.

Figure 10:
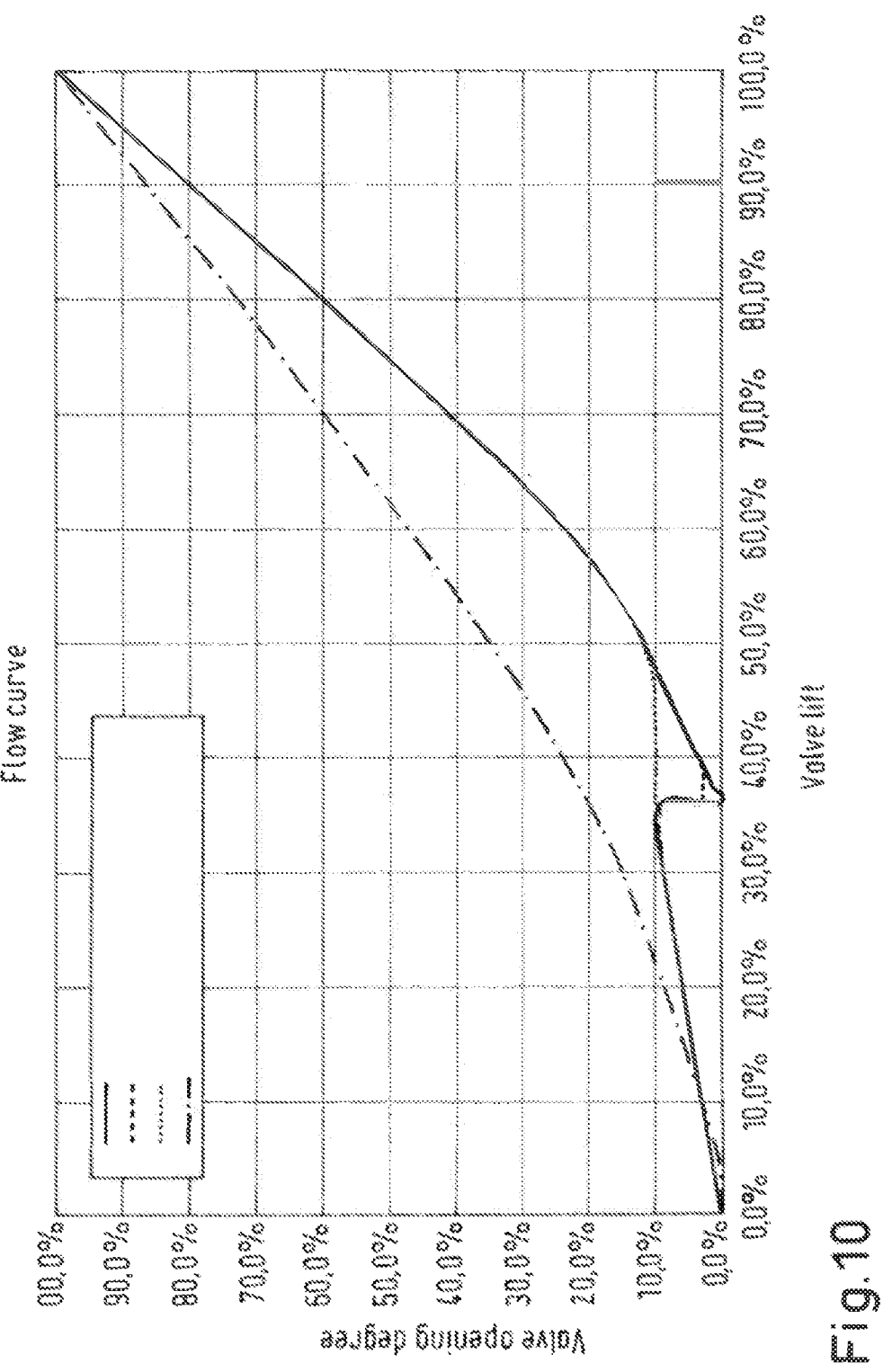
FIG. 10: flow curves describing the flow characteristics of the various embodiments.

FIG. 10 shows flow curves describing the flow characteristics of the various embodiments. The graphs denote the valve opening given in percent versus the valve lift in percent. Here, the valve lift may refer to the lift of the previously described control element 2. The solid line denotes the flow curve of the first embodiment, the dotted line denotes the flow curve of the second embodiment, the dashed line denotes the flow curve of the third embodiment, and the chain line denotes the flow curve of the fourth embodiment.

Figure 11:
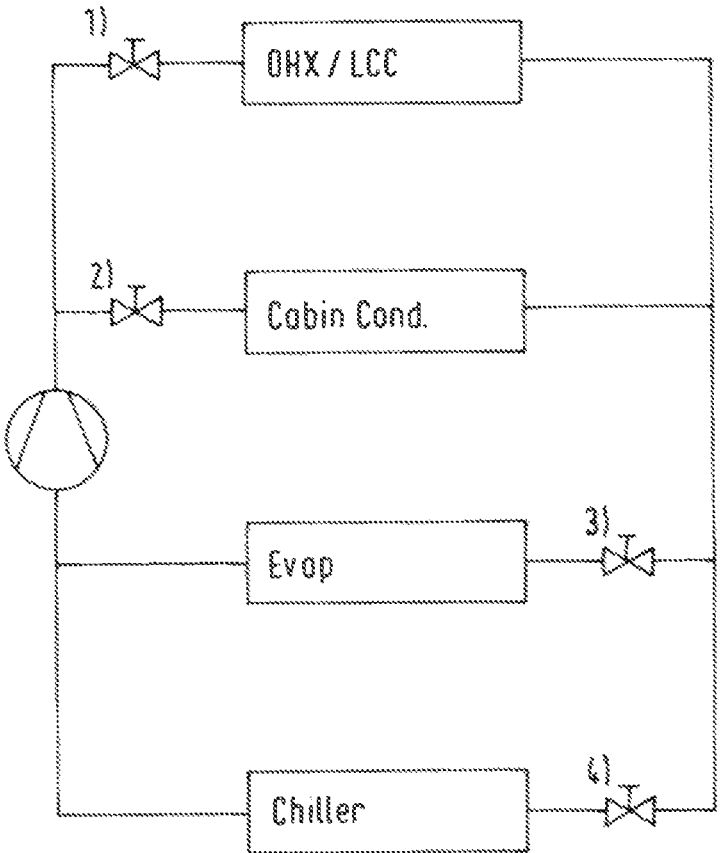
FIG. 11: a system diagram showing the possible applications of the valve according to the invention.

FIG. 11 shows a system diagram with the possible applications of the valve according to the invention. When the valve us used in the context of a refrigeration and/or air-conditioning application, position 1) denotes the use of the valve as a bypass for reducing a pressure drop or as a vapour control device for controlling condenser temperature. When the valve is used in position 2), the valve may be used for the same purposes.

When the valve is used in position 3), it may provide control for a superheating process or provide a boost function for as fast air-conditioning pull down. When the valve is used in position 4), it may again provide control for a superheating process or provide a fast charging boost function.

The invention is not limited to the present embodiments but may be adapted in various ways. All features disclosed in the claim set, the description and the figures including constructive details and spatial arrangements may be relevant to the invention alone or in various combinations with each other.

What is claimed is:

1. An active balancing valve for a refrigeration and/or air-conditioning application, comprising
   a valve housing with an inlet orifice, an outlet orifice and a mounting portion,
   a main valve element with a main pressure balance orifice, and
   a control element at least partially defining a pressure balance passage,
   wherein each element is slidable inside the valve housing and comprises a control surface for controlling a fluid flow between the inlet orifice and the outlet orifice,
   wherein the main pressure balance orifice of the main valve element is closed by the control element in a closed state of the valve,
   wherein the pressure balance passage provides a fluid connection between a fluid chamber at the top of the control element and the bottom of the control element, wherein the fluid chamber is only in fluid communication with the pressure balance passage,
   wherein a linear actuator or a portion of a linear actuator for actuating the control element is provided at the mounting portion, and
   wherein the fluid chamber is provided between the linear actuator on the one side and the control element and the main valve element on the other side.

2. The active balancing valve according to claim 1, wherein the control element is provided at least partially inside the main valve element.

3. The active balancing valve according to claim 1, wherein the control element is slidable relative to the main valve element, wherein the sliding distance corresponds to the distance between the position at which a secondary control surface of the control element contacts the main pressure balance orifice and the position at which a secondary stopper of the control element contacts a main stopper of the main valve element.

4. The active balancing valve according to claim 3, wherein the secondary stopper and the main stopper are contactable for blocking a fluid passage from the inlet orifice to the outlet orifice.

5. The active balancing valve according to claim 3, wherein a secondary pressure balance orifice is provided in the control element between the secondary control surface and the secondary stopper of the control element.

6. The active balancing valve according to claim 3, wherein the main valve element comprises two main valve element portions, wherein an internal main valve element portion is insertable into an outer main valve element portion and comprises the main stopper.

7. The active balancing valve according to claim 6, wherein the two main valve element portions comprise fluid conduits for fluidly connecting the inlet orifice to the inside of the internal main valve element portion.

8. The active balancing valve according to claim 1, wherein a spring is provided for pressing the control element and/or the main valve element in the direction of the outlet orifice.

9. The active balancing valve according to claim 1, wherein the control element comprises a check valve and/or that the control surface of the main valve element contacts the valve housing.

10. The active balancing valve according to claim 1, wherein the control element is slidable relative to the main valve element and/or the control element comprises a large diameter cylindrical portion and small diameter cylindrical or conical portion, wherein the large diameter cylindrical portion extends over a greater distance in an axial direction of the valve than the small diameter cylindrical or conical portion.

11. The active balancing valve according to claim 10, wherein a secondary pressure balance orifice is provided at the small diameter cylindrical or conical portion or between the large diameter cylindrical portion and the small diameter cylindrical or conical portion and/or that the pressure balance passage is connected to the secondary pressure balance orifice.

12. The active balancing valve according to claim 1, wherein the control element is slidable relative to the main valve element and/or the control element comprises a large diameter cylindrical portion, a small diameter cylindrical or conical portion, an intermediate diameter cylindrical portion and a short large diameter cylindrical portion, wherein the large diameter cylindrical portion extends over a greater distance in an axial direction of the valve than the small diameter cylindrical or conical portion and/or wherein the intermediate diameter cylindrical portion is positioned between the large diameter cylindrical portion and the short large diameter cylindrical portion.

13. The active balancing valve according to claim 12, wherein another secondary pressure balance orifice is provided at the short large diameter cylindrical portion and the pressure balance passage is connected to the other secondary pressure balance orifice.

14. The active balancing valve according to claim 12 wherein the large diameter cylindrical portion and the short large diameter cylindrical portion have the same diameter.

15. The active balancing valve according to claim 12, wherein the interior of the main valve element comprises an internal small diameter cylindrical portion and an internal large diameter cylindrical portion, wherein the internal small diameter cylindrical portion is longer than the internal large diameter cylindrical portion in an axial direction thereof.

16. The active balancing valve according to claim 10, wherein a secondary stopper of the control element is provided opposite the small diameter cylindrical or conical portion for contacting a main stopper of the main valve element and/or that a fluid conduit is provided for fluidly connecting the inlet orifice to the inside of the main valve element.

17. The active balancing valve according to claim 12, wherein the distance between the internal small diameter cylindrical portion and the short large diameter cylindrical portion at least partially defines a fluid passage from the inlet orifice to the outlet orifice.

18. An active balancing valve for a refrigeration and/or air-conditioning application, comprising
   a valve housing with an inlet orifice, an outlet orifice and a mounting portion, a main valve element with a main pressure balance orifice, and a control element at least partially defining a pressure balance passage, wherein each element is slidable inside the valve housing and comprises a control surface for controlling a fluid flow between the inlet orifice and the outlet orifice, wherein the main pressure balance orifice of the main valve element is closed by the control element in a closed state of the valve, wherein the pressure balance passage provides a fluid connection between a fluid chamber at the top of the control element and the bottom of the control element, and wherein the control element is slidable relative to the main valve element, wherein the sliding distance corresponds to the distance between the position at which a secondary control surface of the control element contacts the main pressure balance orifice and the position at which a secondary stopper of the control element contacts a main stopper of the main valve element.

19. The active balancing valve according to claim 18, wherein a linear actuator or a portion of a linear actuator for actuating the control element is provided at the mounting portion, and wherein the fluid chamber is provided between the linear actuator on the one side and the control element and the main valve element on the other side.

20. The active balancing valve according to claim 18, wherein the fluid chamber is only in fluid communication with the pressure balance passage.

\* \* \* \* \*